(12) United States Patent
Melikyan et al.

(10) Patent No.: US 12,055,776 B2
(45) Date of Patent: Aug. 6, 2024

(54) PHOTONIC INTEGRATED CIRCUIT HAVING ARRAY OF PHOTONIC DEVICES

(71) Applicant: II-VI DELAWARE, INC., Wilmington, DE (US)

(72) Inventors: Argishti Melikyan, Marlboro, NJ (US); Po Dong, Morganville, NJ (US); Jiashu Chen, Milpitas, CA (US)

(73) Assignee: II-VI DELAWARE, INC., Wilmington, DE (US)

( * ) Notice: Subject to any disclaimer, the term of this patent is extended or adjusted under 35 U.S.C. 154(b) by 163 days.

(21) Appl. No.: 17/647,423

(22) Filed: Jan. 7, 2022

(65) Prior Publication Data
US 2023/0221513 A1 Jul. 13, 2023

(51) Int. Cl.
*G02B 6/12* (2006.01)
*G02B 6/42* (2006.01)
*G02B 6/43* (2006.01)

(52) U.S. Cl.
CPC ............. *G02B 6/43* (2013.01); *G02B 6/4278* (2013.01); *G02B 6/428* (2013.01)

(58) Field of Classification Search
CPC ........ G02B 6/43; G02B 6/4278; G02B 6/428; G02B 6/12004; G02B 6/4246; G02B 6/4274; G02B 6/4295; G02B 2006/12085; G02F 1/0147; G02F 1/0121; G02F 1/025; G02F 1/015
USPC .......................................................... 385/14
See application file for complete search history.

(56) References Cited

U.S. PATENT DOCUMENTS

| | | | |
|---|---|---|---|
| 5,319,182 A * | 6/1994 | Havens | H01L 27/156 |
| | | | 250/208.2 |
| 7,573,037 B1 * | 8/2009 | Kameshima | A61B 6/4233 |
| | | | 250/370.09 |
| 10,043,051 B2 * | 8/2018 | Huang | G06T 11/60 |
| 10,126,496 B1 | 11/2018 | Sun | |
| 2002/0134916 A1 * | 9/2002 | Bird | H04N 25/76 |
| | | | 348/E3.029 |
| 2009/0050788 A1 | 2/2009 | Deckert | |

(Continued)

FOREIGN PATENT DOCUMENTS

EP 0603972 A1 6/1994
WO 2021116766 A1 6/2021

OTHER PUBLICATIONS

"Certificate of Correction Issued in US810126496B1".
(Continued)

*Primary Examiner* — Kaveh C Kianni
*Assistant Examiner* — Hung Q Lam
(74) *Attorney, Agent, or Firm* — Blank Rome LLP

(57) ABSTRACT

A photonic integrated circuit (PIC) device has photonic devices arranged in an array with respect to control and common conductors. Each of the photonic devices has a photonic component (e.g., photodiode, thermo-optic phase shifter, etc.) and a switching diode connected in series with one another between a control connection and a common connection. The photonic component has at least one optical port, which can be coupled to a waveguide in the PIC device. The switching diode is configured to switch between reverse and forward bias in response to the electrical signals. In this way, control circuitry for providing control and monitoring signals to the conductors can be greatly simplified, and the PIC device can be more compact.

19 Claims, 6 Drawing Sheets

(56) References Cited

U.S. PATENT DOCUMENTS

2014/0068534 A1    3/2014  Lee et al.
2020/0150464 A1    5/2020  Charbonnier et al.
2021/0356249 A1   11/2021  Swanson

OTHER PUBLICATIONS

Padmaraju, Kishore , et al., "Integrated Thermal Stabilization of a Microring Modulator, Optical Society of America, 2013 (3 pages)".
Sun, Chen , et al., "Single-chip Microprocessor That Communicates Directly Using Light, Nature, 2015, 528:24(11 pages)".
Van Berkel, Cees , "a-Si:H Diodes for Active Matrix Addressing, Optoelectronics—Devices and Technologies, 1994, 9:3:323-336".

* cited by examiner

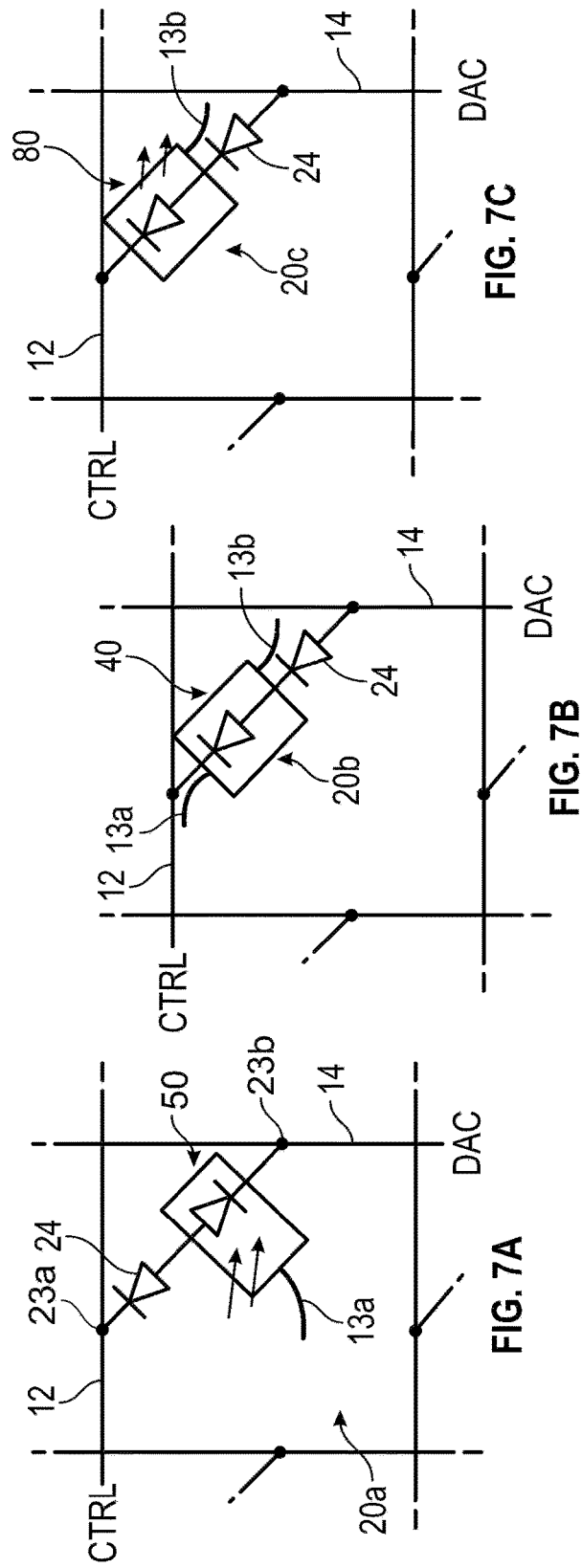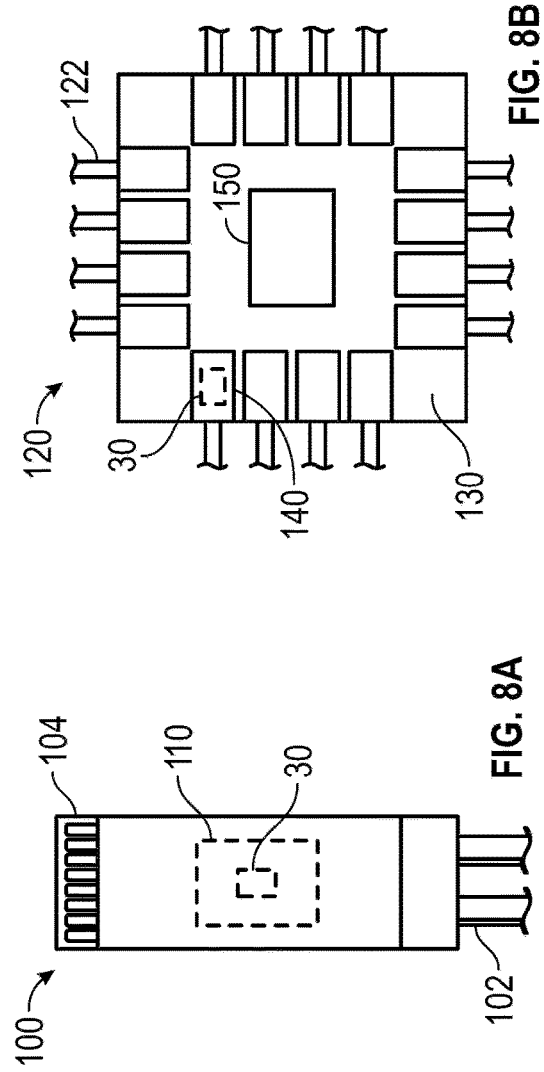

PHOTONIC INTEGRATED CIRCUIT HAVING ARRAY OF PHOTONIC DEVICES

BACKGROUND OF THE DISCLOSURE

Optical transceivers, network switches, and other devices use photonic integrated circuits (PIC) having several channels and photonic integrated components. The industry strives to continuously increase the data rate of these components. As expected, however, this goal provides several challenges.

When designing a PIC transceiver to handle a large number of channels, for example, the layout required to control and monitor the bias points of the photonic integrated components becomes more challenging due to the required number of digital-to-analog (D/A) and analog-to-digital (ND) converters needed. Indeed, the electrical routing and packaging for a PIC device become even more complex when the number of channels is greater than eight.

For instance, a Co-Packaged Optics (CPO) implementation for 32 channels would require monitoring of 64 photodiodes and would require control of 32 optical phase shifters. Such an implementation would require at least two 16-channel D/A converters and would require four 16-channel A/D converters. The space required for these components poses severe limitations on further reduction of the PIC package's form factor.

There are two main solutions currently used in the industry to provide an increased number of channels for a PIC device while conserving the space required. One solution is to use monolithic integration of the control electrical integrated circuit (EIC) with the PIC device. Unfortunately, this solution is costly and can increase the die size of the PIC device. Another solution is to co-package the control EIC with the PIC device on a single substrate or package. This solution has the drawback of requiring more real estate to be used on the substrate due to the relatively large footprints of D/A and A/D converters that have more than eight channels.

The subject matter of the present disclosure is directed to overcoming or at least reducing the effects of, one or more of the problems set forth above.

SUMMARY OF THE DISCLOSURE

A photonic integrated circuit (PIC) device disclosed herein is operated by electrical signals. The PIC device comprises a control conductor, a common conductor, a photonic device, and at least one optical coupling. The control conductor is configured to conduct the electrical signals, and the common conductor is configured to conduct the electrical signals.

The photonic device has a control connection, a common connection, a photonic component, and a switching diode. The control connection is electrically connected to the control conductor, and the common connection is electrically connected to the common conductor. The photonic component and the switching diode are connected in series with one another between the control connection and the common connection. The photonic component has at least one optical port, and the switching diode is configured to switch between reverse and forward bias in response to the electrical signals. The at least one optical coupling of the PIC device is disposed in optical communication with the at least one optical port. The photonic component can include a photodiode, a tunable optical component, a resistor, or an active diode.

A photonic integrated circuit (PIC) device disclosed herein is operated by electrical signals. The PIC device comprises control conductors, common conductors, photonic devices (arranged in an array), and optical couplings, each as described above.

An optoelectronic chip as disclosed herein can comprise a PIC device as described above. The optoelectronic chip can further comprise control circuitry having control ports and common ports. Each of the control ports can be electrically connected to one of the control conductors, and each of the common ports can be electrically connected to one of the common conductors.

An optoelectronic device as disclosed herein can comprise the optoelectronic chip as described above. For example, the optoelectronic device can be a pluggable transceiver having the optoelectronic chip. Alternatively, the optoelectronic device can comprise: a circuit board; a plurality of transceivers each having one of the optoelectronic chips and each disposed on the circuit board; and an application-specific integrated circuit disposed on the circuit board and in electrical communication with the transceivers.

The foregoing summary is not intended to summarize each potential embodiment or every aspect of the present disclosure.

BRIEF DESCRIPTION OF THE DRAWINGS

FIGS. 7A-7C illustrate array units for a PIC device having other photonic components.

FIG. 8A illustrates a pluggable module having an assembly according to the present disclosure.

FIG. 8B illustrates an apparatus of co-packaged optics having multiple assemblies of the present disclosure used with an application-specific integrated circuit.

DETAILED DESCRIPTION OF THE DISCLOSURE

Figure 1:
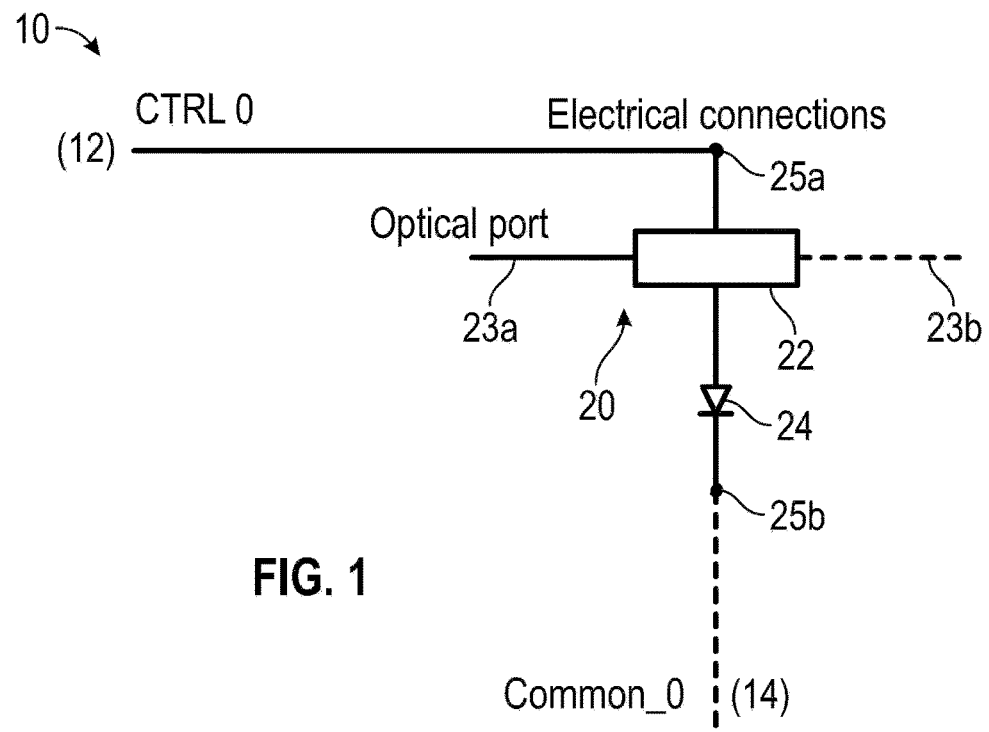
FIG. 1 illustrates a schematic view of a photonic integrated circuit (PIC) device having a photonic component according to the present disclosure.

FIG. 1 illustrates a schematic view of a photonic integrated circuit (PIC) device 10 according to the present disclosure. The PIC device 10 is operated by electrical signals and includes a control conductor 12, a common conductor 14, and a photonic device 20. The control and common conductors 12, 14 are configured to conduct the electrical signals for the photonic device 20.

As will be appreciated and as not necessarily depicted here in this schematic figure, the photonic device 20 can be implemented as part of a silicon photonic device. In this way, the photonic device 20 can be co-integrated with transistor-based electronics. The electrical conductors 12, 14 are electrodes, transmission lines, and the like fabricated in the PIC device 10 with an electrically conductive material. In Si foundry design, the electrical conductors 12, 14 are typically laid out in a co-planar geometry.

The photonic device 20 includes a photonic component 22 and a switching diode 24. As noted below, the photonic component 22 can be an active or a passive component and can be a photodiode, a phase shifter, a phase modulator, an amplitude modulator, a variable optical attenuator, or the like.

In general, the photonic device 20 has a control connection 25a electrically connected to the control conductor 12 and has a common connection 25b electrically connected to the common conductor 14. The photonic component 22 and the switching diode 24 are connected in series with one another between these control and common connections 25a-b.

The photonic component 22 has at least one optical port, such as an input port 23a and/or an output port 23b, for passage of optical signals relative to the photonic component 22. Depending on the particular component 22, the optical port 23a-b can be an input for receiving (or an output for transmitting) optical signals. A given component 22 may have both input and output optical ports 23a-b.

Implemented in the PIC device 10, the photonic device 20 can be a waveguide coupled device. For instance, at least one optical coupling, such as a waveguide (not shown), can be disposed in optical communication with the optical port 23a-b. For example, the component 22 as a photodiode would include an input waveguide at an input port 23a, but no output port or waveguide. On the other hand, the component 22 as a tunable optical element would include input and output waveguides at the input and output ports 23a-b, respectively.

The electrical connection 25a of the photonic component 22 connects to a control signal source on the control conductor 12. As disclosed in more detail below, the switching diode 24 is configured to switch between reverse and forward bias in response to control electrical signals communicated by the control conductor 12. As will be appreciated, the diode 24 requires a minimum threshold voltage. For forward bias, the voltage across the diode 24 permits normal current flow. However, in reverse bias, the voltage across the diode 24 in the reverse direction produces negligible current flow.

Depending on the photonic component 22 to which the switching diode 24 is connected in series, this switching by the diode 24 turns the photonic device 20 either "ON" or "OFF" in a general sense. For example, a control electrical signal on the control conductor 12 can be switched between HI and LO values to pull the potential across the component 22 either up (down) or down (up) depending on the orientation of the switching diodes 24.

For its part, the photonic component 22 integrates the interaction of optical and electrical signals based on the component's operation. As a photodiode, for example, the component 22 responds to optical signals received at the optical input port 23a and produces an electrical response relative thereto. In turn, monitoring of the response on the common conductor 14 can provide information for processing, which would be directed to the overall implementation at hand.

Figure 2:
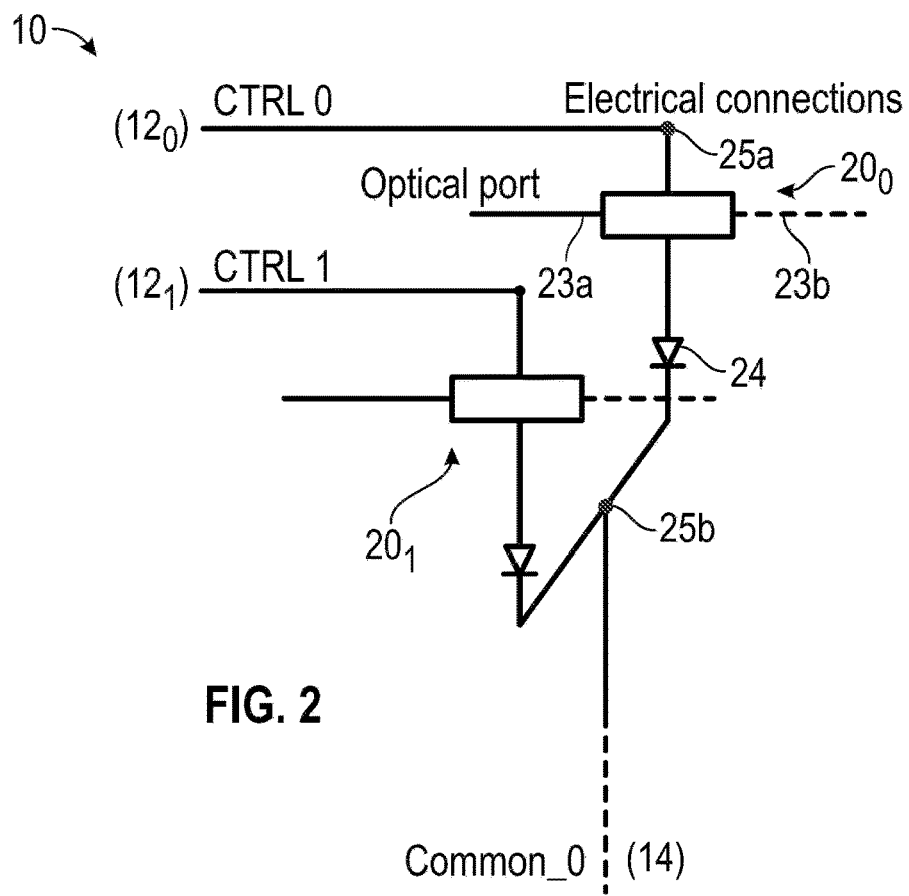
FIG. 2 illustrates a schematic view of a PIC device having a plurality of photonic components according to the present disclosure.

Such a PIC device 10 having a photonic device 20 as in FIG. 1 can be useful on its own but can be further useful when multiple photonic devices 20 are combined as units into a PIC device 10. For example, FIG. 2 illustrates a schematic view of a PIC device 10 having a plurality of photonic devices $20_0$, $20_1$ according to the present disclosure. Each of these photonic devices $20_0$, $20_1$ can be similar to that disclosed in FIG. 1.

The PIC device 10 includes a plurality of control conductors $12_0$, $12_1$, each being configured to conduct control electrical signals to a respective one of the photonic devices $20_0$, $20_1$. Each of the photonic devices $20_0$, $20_1$ has a control electrical connection electrically connected to a respective one of the control conductors $12_0$, $12_1$. However, each of the photonic devices $20_0$, $20_1$ share a common conductor 14.

As can be seen, individual optical signals can communicate to/from the independent photonic devices $20_0$, $20_1$ through the ports 23a-b. Through a multiplexing and timing scheme, individual control electrical signals on the separate control conductors $12_0$, $12_1$ can switch the accompanying diodes 24 of the independent photonic devices $20_0$, $20_1$. Common monitoring of the common conductor 14 can then be used to separately monitor the independent photonic devices $20_0$, $20_1$.

Figure 3:
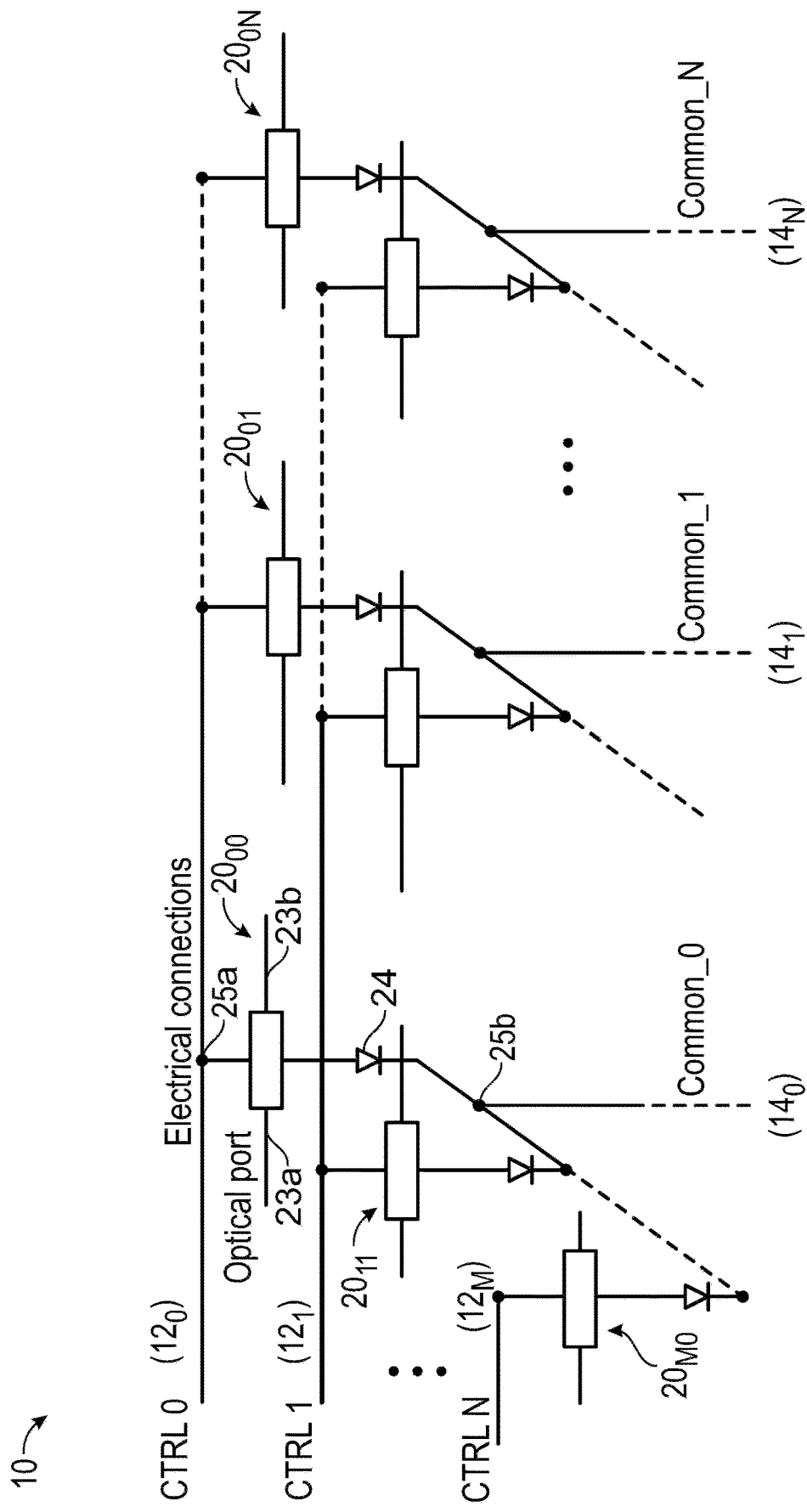
FIG. 3 illustrates a schematic view of another PIC device having a plurality of photonic components according to the present disclosure.

As a further example, FIG. 3 illustrates a schematic view of another PIC device 10 having a plurality of photonic devices 20 according to the present disclosure. Here, the photonic devices $20_{00}$ . . . $20_{MN}$ can be connected in an array having multiple rows and columns structured in parallel. The photonic devices $20_{00}$ . . . $20_{MN}$ in each row are connected to the same control conductor $12_0$ . . . $12_M$, and the photonic devices $20_{00}$ . . . $20_{MN}$ in each column are connected to the same common conductor $14_0$ . . . $14_N$. The array may or may not be symmetric in size.

As can be seen, individual optical signals can communicate to/from the independent photonic devices $20_{00}$ . . . $20_{MN}$ via the optical ports 23a-b. Through a multiplexing and timing scheme, individual control electrical signals on the separate control conductors $12_0$ . . . $12_M$ can switch the accompanying diodes 24 of the independent photonic devices $20_{00}$ . . . $20_{MN}$. In essence, the switching diode 24 turns on a unit cell in the array. Common monitoring of the common conductors $14_0$ . . . $14_N$ can then be used to separately monitor the independent photonic devices $20_{00}$ . . . $20_{MN}$.

Briefly, a control signal $12_0$ can switch "ON" the photonic devices $20_{00}$ . . . $20_{0N}$ on row 0. Meanwhile, the common conductors $14_0$ . . . $14_N$ can be used for the individual response signal, photocurrent, or the like of the respective devices $20_{00}$ . . . $20_{0N}$ on row 0 depending on the photonic component 22 used.

Understanding a photonic device 20 of the present disclosure and how the photonic devices 20 can be integrated together in a PIC device 10, the discussion turns to some particular examples of PIC devices 10 of the present disclosure.

Figure 4:
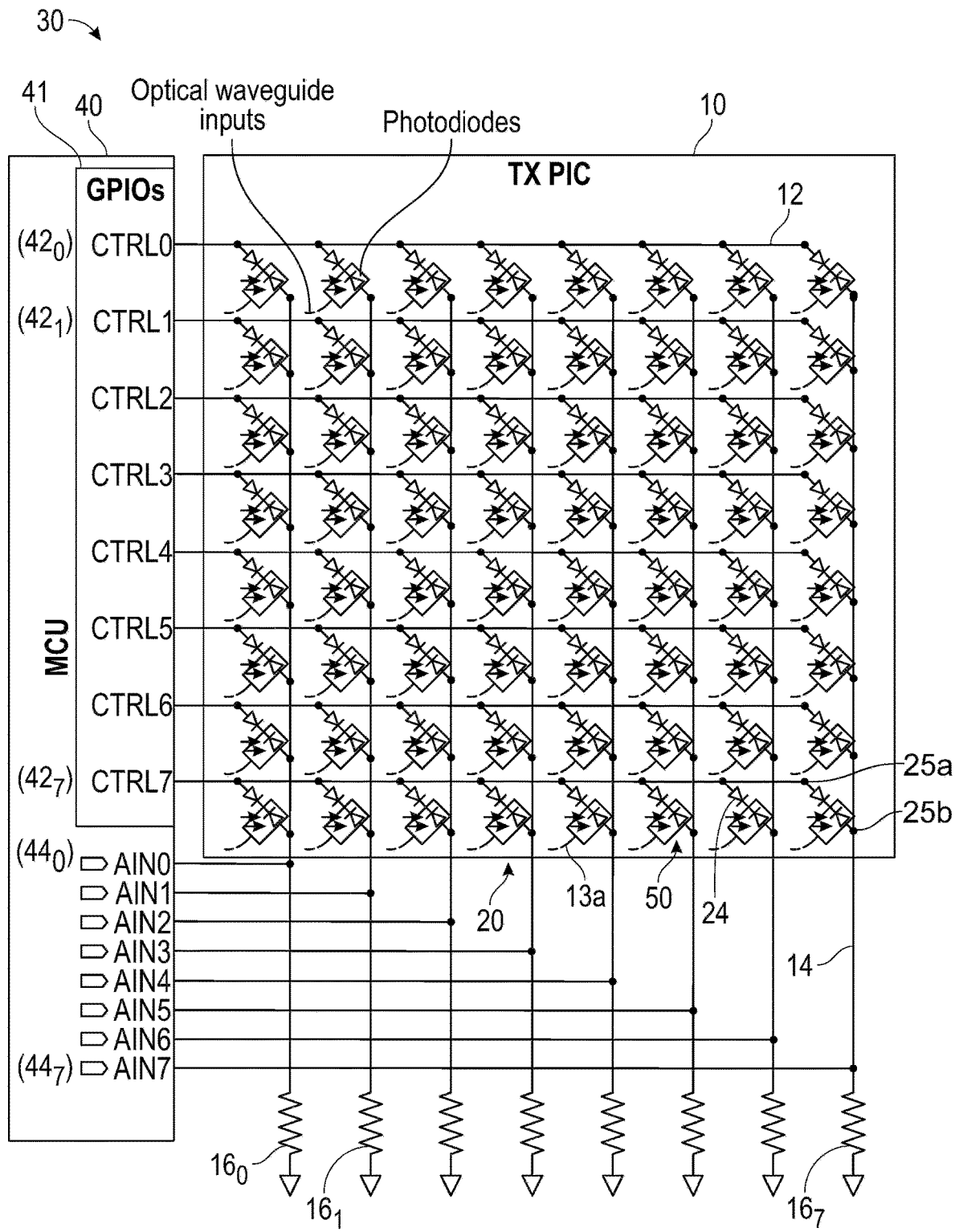
FIG. 4 illustrates a PIC device having an array of photonic components and control circuitry according to the present disclosure.

FIG. 4 illustrates an assembly 30 having a PIC device 10 and control circuitry 40 according to the present disclosure. The PIC device 10 includes an array of photonic devices 20 arranged as unit cells inside the PIC device 10 and electrically connected to the control circuitry 40.

As before, each of the photonic devices 20 includes a photonic component 50 connected in series to a switching diode 24. Likewise, each photonic device 20 as a unit cell has a control connection to a control conductor 12 of the array and has a common connection to a common conductor 14 of the array. In this example, the array includes sixty-four (64) unit cells of the photonic devices 20 with eight control conductors 12 and eight common conductors 14.

Here, each of the photonic components 50 is a photodiode connected in series to the switching diode 24. In general, either the anode of the photodiode 50 is connected to an anode of the switching diode 24, or the cathode of the photodiode 50 is connected to a cathode of the switching diode 24. In this example, the cathode of the photodiode 50 is connected to the cathode of the switching diode 24, but the reverse arrangement can be used. As shown, all of the unit cells can be the same to provide an arrangement that is symmetrical. However, an asymmetrical arrangement can be used, such as where a switching diode 24 on one (1) unit cell is oppositely biased relative to another unit cell.

Here, the photodiode 50 is a power-sensing photodiode. Switching the control signal HI "activates" sensing by the photodiode 50 (i.e., so that photocurrent can be measured). By contrast, switching the control signal LO "deactivates" sensing by the photodiode 50 so that photocurrent cannot be measured. Overall, the optical sensing by the photodiode 50 may be customary, but the implementation is reduced significantly at the chip level.

Both the photodiode 50 and the switching diode 24 can be designed and monolithically fabricated in a silicon photonic foundry as part of the silicon-based PIC device 10. When fabricated as a silicon photonic circuit, the photodiodes 50 can be germanium-based or based on an III/V-silicon material, while the electrical switching diodes 24 can be silicon diodes. Each of the photodiodes 50 has an optical input, and a waveguide 13*a* fabricated in the PIC device 10 is disposed in optical communication with the optical input of the photodiode 50. In general, the waveguide 13*a* can use a butt-coupling (the photodiode's absorbing region being disposed in a recess at an end of the waveguide 13*a*) or a vertical coupling (the photodiode's absorbing region being disposed on top of the waveguide 13*a*). Although not shown, one or multiple of the photodiodes 50 within the array may be physically connected and may belong to the same photonic component on the PIC device 10, such as a filter, Mach-Zehnder modulator, etc.

The control circuitry 40 is electrically connected to the conductors 12, 14 of the PIC device 10. The control circuitry 40 can be a microcontroller unit (MCU) and can have various conventional elements not explicitly shown. The control circuitry 40 includes a control interface 41, which can use digital general-purpose input/output (GPIOs) signals or can use low-resolution D/A signals—referenced herein as control signals $42_0 \ldots 42_7$. The control signals $42_0 \ldots 42_7$ are connected to each of the rows of control conductors 12 in the PIC device 10. Depending on the signal state (e.g., HI or LO), the control signals $42_0 \ldots 42_7$ can turn on (off) the row conductors 12 by pulling the row potential either up (down) or down (up) based on the orientation of the switching diodes 24.

The common conductors 14 of the PIC device 10 arranged in columns are connected to a DC ground or another voltage level through shunt resistors $16_0 \ldots 16_7$. For each column of the common conductors 14, the control circuitry 40 uses a voltage sensing A/D converter $44_0 \ldots 44_7$ that can measure the voltage drop across the shunt resistor $16_0 \ldots 16_7$ to monitor the electrical response of the photodiodes 50. In general, the shunt resistance may be greater than 1 Ohm and smaller than 10 G Ohm. Alternatively, instead of the voltage sensing A/D converters $44_0 \ldots 44_7$, a current input A/D converter (not shown) can be directly connected to the columns of the common conductors 14 without the use of the shunt resistors.

Overall, the assembly 30 provides for a simple input-output scheme by reducing the input-outputs on the chip for the PIC device 10 The assembly 30 also reduces the number of converters needed and reduces the number of analog connections between the elements.

In this configuration, the array of photodiodes 50 and switching diodes 24 in series as unit cells allows 8× multiplexing for monitoring the photocurrents of the sixty-four photodiodes 50 by using eight A/D converters $44_0 \ldots 44_7$. A conventional arrangement would require 65 input/outputs (64 plus on common). Here, the assembly 30 has sixteen input/outputs. For a given arrangement, the conventional input/outputs N required can be reduced using the disclosed configuration to $2\sqrt{N}$.

Finally, the switching diodes 24 and the multiplexing that uses the control signals on the control conductors 12 allows the several photonic devices 20 to be activated and inactivated in a controlled manner and can reduce the effects of crosstalk in the array. The control signals and the monitor signals are synchronized and timewise separated to achieve operation.

Figure 5:
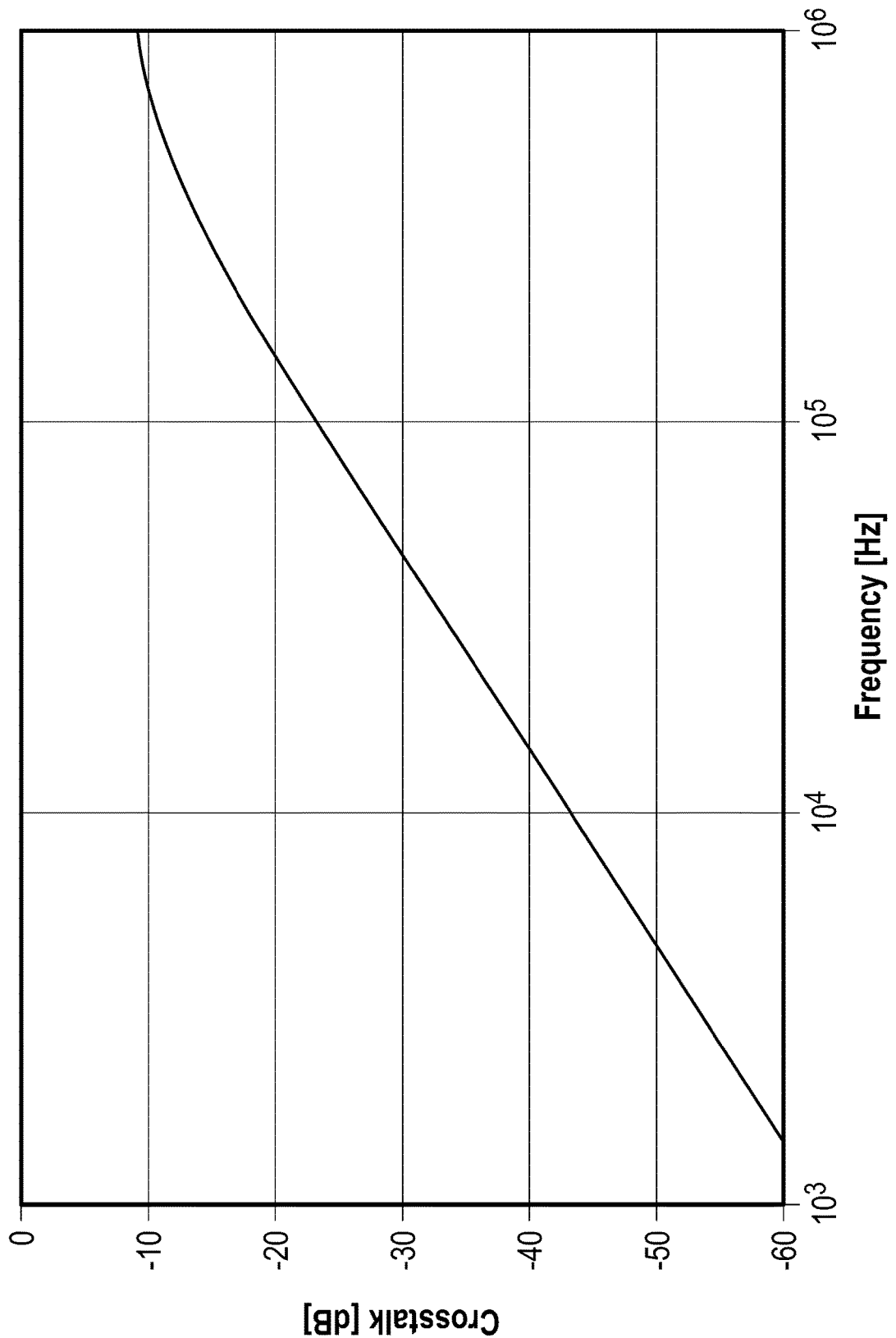
FIG. 5 is an example graph of crosstalk for the purposes of discussion.

For the purposes of discussion, FIG. 5 is a graph showing Off-row/On-row crosstalk for an example 2×2 photodiode unit cell. The example here is not subject to the teachings of the present disclosure but is provided to show information about issues related to crosstalk.

As shown in the graph, crosstalk increases with frequency. Extrapolated to an array having more photodiode unit cells as in the present disclosure, the graph would indicate that crosstalk between densely arranged unit cells of photodiodes can be quite problematic. Beneficially, the switching diodes 24 used in series with the photodiodes 50 of the configuration in FIG. 4 allows for isolated activation and monitoring of the photocurrents of the photodiodes 50 in a way that can reduce issues with crosstalk in the disclosed PIC device 10. In fact, the switching diodes 24 can act against signal bouncing and can cut off transients that may contribute to crosstalk or cause other issues.

Figure 6:
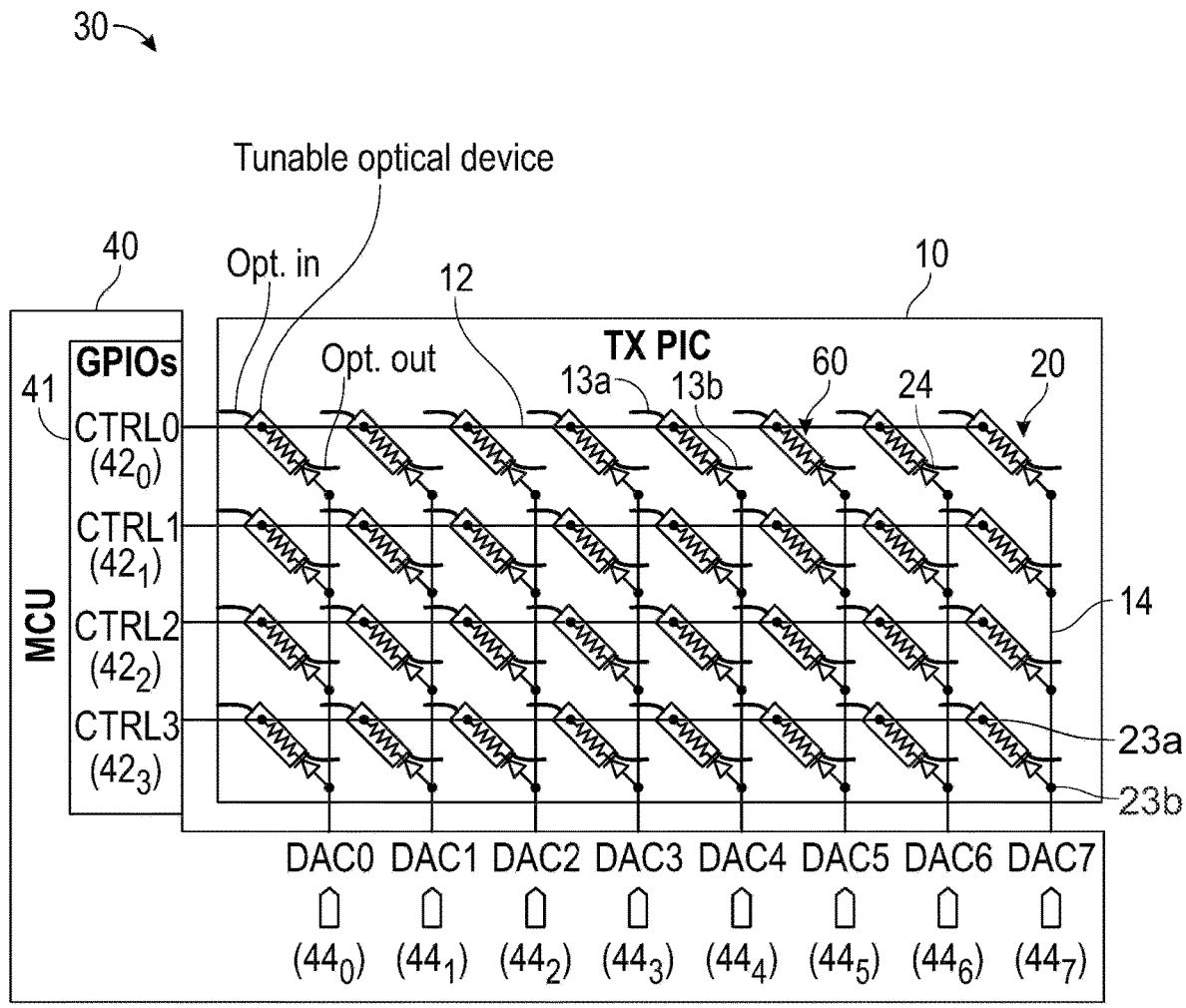
FIG. 6 illustrates another PIC device having an array of photonic components and control circuitry according to the present disclosure.

In the previous example, photodiodes were used in the PIC device 10. As explained, other photonic components can be used. For example, FIG. 6 illustrates an assembly 30 having another PIC device 10 and control circuitry 40. Again, the PIC device 10 includes an array of photonic devices 20 arranged as unit cells inside the PIC device 10 and electrically connected to the control circuitry 40. As shown in FIG. 6, the photonic components 60 in the devices 20 are tunable optical components having an optical input and an optical output. In this case, input and output waveguides 13*a-b* inside the PIC device 10 are disposed in optical communication respectively with the component's optical input and output. As diagrammed, the tunable optical component 60 can be a thermo-optic phase shifter having a resistor (heating element) with one end in electrical connection with the control connection and another end in electrical connection with the switching diode 24.

Similar to the photodiode array, these optical components 60 in the form of thermo-optic phase shifters can be connected in series with a switching diode 24 to control the array using only a few D/A converters. In the example of FIG. 6, the assembly 30 includes a 4×8 array where eight D/A converters $44_0 \ldots 44_7$ are used to control all thirty-two thermo-optic phase shifters 60 by time-sharing a single D/A output with four thermo-optic phase shifters 60 per column. Time-sharing is realized by switching the rows of control conductors 12 "ON/OFF" using digital or low-resolution control signals $42_0 \ldots 42_7$, which can turn on (off) the rows of the thermo-optic phase shifters 60 by pulling the respective rows up (down) or down (up) depending on the orientation of the switching diode 24. In this configuration, the array of the thermo-optic phase shifters 60 allows for 4× multiplexing and control of thirty-two thermo-optic phase shifters 60 using only a single die, eight-channel D/A converter.

Similar to the photodiode 50 and phase shifters 60, other photonic components can be controlled in the same way and can include, but are not limited to phase and/or amplitude modulators, variable optical attenuators, optical filters, phased arrays, etc. As some brief examples, FIGS. 7A-7C illustrate unit cells for a PIC device 10 having other photonic components. The unit cells can be used in an array of other unit cells according to an assembly 30 of the present disclosure.

FIG. 7A shows a cell unit having a photonic device 20a that includes a photodiode 50 connected in series with a switching diode 24. As before, an input waveguide 13a is optically coupled to the photodiode 50. In this example and contrary to that shown in FIG. 4, the anode of the photodiode 50 is connected to the anode of the switching diode 24. The photonic device 20a can operate similar to that disclosed above, but with opposite control signals to switch the switching diode 24. Here, the control signal would be brought LO to activate the device 20a because the switching diode 24 is in forward bias.

FIG. 7B shows a unit cell having another photonic device 20b that includes an active diode 70 for variable optical attenuation. The active diode 70 is connected in series to the switching diode 24 and has the same polarity as the switching diode 24. Input and output waveguides 13a-b couple to the input and output of the active diode 70. Depending on the signals at the conductors 12, 14, the device 20b can attenuate an optical signal passing through the device 20b from the input waveguide 13a to the output waveguide 13b.

FIG. 7C shows a unit cell having yet another photonic device 20c that includes an active diode 80 for light emission. The active diode 80 is connected in series to the switching diode 24 and has the same polarity as the switching diode 24. An output waveguide 13b is coupled to the output of the active diode 80. Depending on the signals at the conductors 12, 14, the device 20c can transmit an optical signal to the output waveguide 13b.

An assembly 30 as disclosed herein can be co-packaged with other electronic components. As shown in FIG. 8A, for example, an assembly 30 having a PIC device (10) and control circuitry (40) of the present disclosure can be part of a transceiver 110, such as used in a pluggable module 100 for connecting fiber optic cables 102 to a host device connect at a pad connection 104 of the pluggable module 100.

Multiple assemblies 30 as disclosed herein can be used together to co-package the optics for integration with other electronic components. For example, FIG. 8B illustrates an apparatus 120 of co-packaged optics having transceivers 140 used with a digital signal processor, such as an application-specific integrated circuit chip 150. Each of the transceivers 140 can include an assembly 30 of the present disclosure, and the ASIC chip 150 can be used as a switch in signal switching and processing. The ASIC chip 150 is mounted on a circuit board 120, which includes printed circuits (not shown) and typical pin connections (not shown) for the ASIC chip 150. The transceivers 140 are mounted on the circuit board 130. In this arrangement, the PIC devices (10) and control circuitry (40) in the assemblies 30 connect multiple optical signals for fiber optical cables 122 with electronic signals of the ASIC chip 150.

As shown in FIGS. 8A-8B, the assemblies 30 of the present disclosure can be used in PIC transceivers 110, 140 that include silicon chips having various optics, lasers, modulators, photodetectors, drive circuits, and the like co-packaged together. As in FIG. 8B, several such PIC transceivers 140 can be packaged together with an electronic switch 150. Overall, the assemblies 30 allow for simplified and cost-efficient multi-channel photonic integrated circuit packages for applications offering a large number of channels.

As disclosed herein, an assembly 30 of the present disclosure comprises a photonic integrated circuit device 10 having at least one photonic component 22 (e.g., a photodiode, a phase shifter, a phase and/or amplitude modulator, a variable optical attenuator, etc.) connected in series to a switching diode 24 and having at least one D/A (or A/D) converter. Overall, the assembly 30 can have an array of the photonic components 22 each connected in series connection with a switching diode 24, and at least one D/A converter's output is connected to the plurality of photonic components 22 (or at least one A/D converter input is connected to the plurality of photonic components 22).

As disclosed herein, the assemblies 30 use A/D and D/A converters having a low channel number to monitor and control a large number of photonic components 22 (e.g., photodiodes, phase elements, phase and/or amplitude modulators, variable optical attenuators (not limited to these components) respectively). There are several advantages to the disclosed configuration. First, this configuration transforms the electrical routing complexity from a package's substrate to the PIC device 10. The costs involved in electrical routing can be efficiently realized on PIC device 10 given the high lithographic resolution that can be achieved in the backend process for the PIC device 10. Second, by utilizing the disclosed configuration, it will be possible to realize relatively smaller PIC packages given that only a few A/D and D/A converter channels are required.

The PIC device 10 of the present disclosure provides a space-efficient chip, and high-resolution lithography and other manufacturing techniques can be used to produce dense electronic connections. In fact, the PIC device 10 does not require a printed circuit board or separate electrical substrate because the photonic device 20 is implemented at the chip level.

For example, the photodiode 50 and switching diode 24, such as in FIG. 4, have different subject materials applied at the chip level. The switching diode 24 is optically isolated from the optical signal and/or the switching diode's material is not configured to absorb light. By contrast, the photodiode 50 arranged in series with the switching diode 24 does optically communicate with the optical signal via a waveguide 13a, and the photodiode's material is configured to absorb light. Appropriate design and manufacture of these and other characteristics at the chip level can increase the density of the cell units and reduce the size of the PIC device 10.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

What is claimed is:

1. A photonic integrated circuit (PIC) device configured to be operated by electrical signals generated by control circuitry, the PIC device comprising:
   a control conductor configured to conduct the electrical signals;

a plurality of photonic devices that are each electrically connected to the control conductor at a respective control connection and are each configured to receive the electrical signals from the control conductor, each of the plurality of photonic devices comprising:
- a photonic component comprising at least one optical port; and
- an electrical switching diode configured to switch between a reverse bias and a forward bias in response to the electrical signals generated by the control circuitry and conducted by the control conductor;

a common conductor electrically connected to each of the plurality of photonic devices at a respective common connection; and a plurality of waveguides, each of the plurality of wave guides are in optical communication with the at least one optical port of a respective one of the plurality of photonic devices, wherein:

the photonic component and the electrical switching diode of each of the plurality of photonic devices are connected in series between the respective control connection and the respective common connection, and the control conductor and the common conductor are electrically connected such that electronic communication of the electrical signals conducted from the control conductor must pass through at least one of the plurality of photonic devices before reaching the common conductor.

2. The PIC device of claim 1, wherein:
the photonic component of each of the plurality of photonic devices comprises a photodiode comprising an anode and a cathode, and
either the anode of the photodiode is connected to an anode of the electrical switching diode of the respective photonic device or the cathode of the photodiode is connected to a cathode of the electrical switching diode of the respective photonic device.

3. The PIC device of claim 1, wherein:
the photonic component of each of the plurality of photonic devices comprises a photodiode comprising an optical input for the at least one optical port of the respective photonic device, and
a respective waveguide of the plurality of waveguides is disposed in optical communication with the optical input of the photodiode.

4. The PIC device of claim 1, wherein:
the photonic component of each of the plurality of photonic devices comprises a tunable optical component comprising an optical input and an optical output for the at least one optical port, and
the plurality of wave guides comprise respective input and output waveguides disposed in optical communication respectively with the respective optical input and the respective optical output.

5. The PIC device of claim 4, wherein the tunable optical component of each of the plurality of photonic devices comprises a resistor comprising one end in electrical connection with the respective control connection and another end in electrical connection with the respective electrical switching diode.

6. The PIC device of claim 4, wherein the tunable optical component of each of the plurality of photonic devices comprises an active diode for variable optical attenuation, the active diode is connected in series to the respective electrical switching diode and has a same polarity as the respective electrical switching diode.

7. The PIC device of claim 1, further comprising a plurality of common conductors, the common conductor being one common conductor of the plurality of common conductors, each common conductor of the plurality of common conductors is configured to conduct the electrical signals.

8. The PIC device of claim 7, further comprising a plurality of signal converters, each signal converter of the plurality of signal converters is connected to a respective one of the common conductors, and each signal converter of the plurality of signal converters is configured to convert the electrical signals for a respective photonic component of the plurality of photonic devices that is in electrical communication with the respective common conductor.

9. The PIC device of claim 1, further comprising a plurality of control conductors, the control conductor being one control conductor of the plurality of control conductors, each control conductor of the plurality of control conductors is configured to conduct the electrical signals.

10. The PIC device of claim 9, further comprising the control circuitry, the control circuitry comprising a plurality of control ports, each control port of the plurality of control ports being connected to a respective control conductor of the plurality of the control conductors, each control port is configured to control the electrical signals between first and second states, wherein
the electrical switching diode of each respective photonic device, when subject to the first state, is configured to switch to one of the reverse and forward bias, and
the electrical switching diode of each respective photonic device, when subject to the second state, is configured to switch to the other of the reverse and forward bias.

11. The PIC device of claim 1, wherein the PIC device is silicon-based.

12. A photonic integrated circuit (PIC) device comprising:
a plurality of control conductors configured to conduct electrical signals;
a plurality of common conductors configured to conduct the electrical signals;
a plurality of photonic devices arranged in an array, each of the plurality of photonic devices being electrically connected to a respective one of the plurality of control conductors at a respective control connection and to a respective one of the plurality of common conductors at a respective common connection, each of the plurality of photonic devices comprising:
- a photonic component comprising at least one optical port and a photodiode comprising an optical input for the at least one optical port; and
- a switching diode connected in series with the photonic component between the respective control connection and the respective common connection, the switching diode being configured to switch between reverse and forward bias in response to the electrical signals;

a plurality of waveguides, each waveguide of the plurality of waveguides is in optical communication with the at least one optical port of a respective one of the photonic devices; and control circuitry comprising a plurality of control ports and a plurality of common ports; wherein
each of the plurality of control ports are connected to a respective one of the plurality of control conductors and are configured to set control signals between first and second states, the switching diode of the respective photonic device subject to the first state is configured to switch to one of the reverse and the forward bias, the switching diode of the respective photonic device subject to the second state is configured to switch to the other of the reverse and the forward bias, and each of the plurality of common ports are connected to a respective one of the common conductors and are configured to conduct current associated with the respective photodiode on the common conductor subject to the forward bias.

13. An optoelectronic chip comprising:
a photonic integrated circuit (PIC) device comprising:
    a plurality of control conductors configured to conduct electrical signals;
    a plurality of common conductors configured to conduct the electrical signals;
    a plurality of photonic devices arranged in an array, each of the plurality of photonic being electrically connected to a respective one of the plurality of control conductors at a respective control connection and to a respective one of the plurality of common conductors at a respective common connection, each of the plurality of photonic devices comprising:
        a photonic component comprising at least one optical port; and
        a switching diode connected in series with the photonic component between the respective control connection and the respective common connection, the switching diode being configured to switch between reverse and forward bias in response to the electrical signals;
    a plurality of waveguides disposed in optical communication with the at least one optical port of respective ones of the photonic components; and control circuitry comprising control ports and common ports, each of the control ports are electrically connected to one of the control conductors, and each of the common ports are electrically connected to one of the common conductors.

14. The optoelectronic chip of claim 13, wherein each control port is configured to control the electrical signals for the photonic component of a respective one of the photonic devices.

15. The optoelectronic chip of claim 13, wherein each common port comprises a signal converter configured to convert the electrical signals for the respective photonic component in electrical communication with the respective common conductor.

16. An optoelectronic device comprising the optoelectronic chip according to claim 13.

17. The optoelectronic chip of claim 13, further comprising a pluggable transceiver.

18. The optoelectronic device chip of claim 13, further comprising:
    a circuit board;
    a plurality of transceivers disposed on the circuit board; and
    an application-specific integrated circuit disposed on the circuit board and in electrical communication with the plurality of transceivers.

19. The PIC device of claim 1, wherein:
the electrical signals are D/A signals, and
the common conductor is configured to supply the electrical signals from the photonic device to one of a plurality of A/D converters of the control circuitry.

\* \* \* \* \*